Patented July 28, 1936

2,048,770

UNITED STATES PATENT OFFICE 2,048,770

MANUFACTURE OF STABILIZED MOTOR FUELS

Eugene Ayres, Swarthmore, Pa., assignor, by mesne assignments, to Gulf Oil Corporation, Pittsburgh, Pa., a corporation of Pennsylvania No Drawing. Application September 8, 1931, Serial No. 561,813

4 Claims. (Cl. 44—9)

This invention relates to manufacture of stabilized motor fuels; and it comprises an improved motor fuel carrying a small percentage of a substance having the property of increasing the duration of the gum induction period and also carrying a small percentage of a substance having the property of decreasing the rate at which gum is formed after the induction period; and it further comprises a process of stabilizing gum forming motor fuels such as gasoline, wherein such fuel in a fresh or newly made condition prior to storage or to transportation and storage is treated by dissolving therein a minimal amount of a substance having the property of increasing the duration of the gum induction period and a substance having the property of decreasing the rate at which gum is formed after the induction period; all as more fully hereinafter set forth and as claimed.

Gasoline made by cracking, and particularly by vapor phase cracking, contains much unsaturated material, some of which is in an unstable condition for a long time after the gasoline is made. This material is responsible for the production of "gum" by a progressive action. Many efforts have been made to obviate the effect of these gum forming ingredients in various ways, taking advantage of their unstability to polymerize and remove them. An ordinary sulfuric acid treatment is not economical since it removes too much valuable oil.

The present invention relates to a simple, ready and economical way of stabilizing unstable cracked gasoline by increasing the period of induction and decreasing the rate of gum formation.

The production of gum in motor fuel takes place in two stages. There is a comparatively long period of induction and after this period of induction there is a rather rapid formation of gum. The period of induction varies with the particular motor fuel and probably with temperatures and other circumstances. The action during the induction period and the action during the gum formation period are not the same and they occur successively. These facts are shown by the tests which are to be described subsequently.

The well known "oxygen stability test" can be employed to measure relative values of the induction period in a fuel. According to this test a sample of the motor fuel is placed in a bomb in an atmosphere of pure oxygen under a pressure of 100 pounds per square inch. The bomb is heated by immersing in boiling water. The rise of temperature causes a rise of pressure to some maximum point dependent upon the volatility of the material being tested. The bomb is kept in boiling water for 4 hours, during which time the pressure is recorded at regular intervals, say every 15 minutes. The number of minutes after the heating is started and until the pressure drops 5 pounds below the maximum pressure, can be used as a measure of the induction period or oxygen stability period, as it is sometimes called. Substances which, when added to the motor fuel, are found to increase this induction period I have called "anti-oxidants". After 4 hours of heating, the bomb is cooled, the sample removed and evaporated in a non-metallic dish for the determination of gum.

When the induction period of a motor fuel equals or exceeds the 4 hours of the test (that is, when the pressure in the bomb does not fall during the test) an exceedingly small amount of gum is formed, whereas with short induction periods, the gum formed is relatively enormous in quantity. In other words, this test shows that the formation of gum is delayed or inhibited during a certain period, beyond which the gum is formed at an enormously increased rate. It is obvious that it is highly important to prolong this initial period.

I have found that, with certain changes, the oxygen stability test can also be used to measure another property of such fuels, namely the rate of gum formation after the expiration of the induction period. I have evaluated this rate of gum formation by a simple method which is useful in determining the effect of added ingredients upon this property.

A sample of gasoline to be tested is advantageously obtained before it has been treated with acid. This sample is divided into several parts which parts are then treated with the same quantity of acid but of various strengths, or with different quantities of acid of the same strength. The object of this is to produce a series of gasolines refined to different degrees, most of which will show an induction period of considerably less than 4 hours. Oxygen stability tests are run on these samples, the amount of gum formed during the 4 hours of the test being determined at the end.

Since gum is formed in quantity only after the lapse of the induction period the time from the end of this period to the end of the test may be taken as the time during which gum is formed or as the "time of gum formation". The total gum formed during the test is found by analysis.

This quantity is then divided by the time of gum formation, which gives values for the rate of gum formation. This rate is determined for each of the various samples mentioned above. The sample having the least treatment with acid naturally has the shortest induction period and hence the longest time of gum formation. The rate of gum formation, however, has been found to decrease somewhat with increase in the time of gum formation.

The results obtained, as described above, for the various samples of gasoline may be plotted. It is convenient to plot the rates of gum formation as ordinates against the times of gum formation as abscissas. A smooth curve is obtained which can then be used as a standard or blank with which to compare similar curves for gasolines of different origin or treatment.

In order to test the effect of various addition agents on the rate of gum formation, a certain amount of one of these agents is added to each of the gasoline samples. The samples are then again subjected to the same tests. The results obtained are compared with the values given by the blank samples. Comparison is best made by comparing the curves obtained after the results are plotted. I have tested a large number of different addition agents by this method and over an extended range of concentrations. The agents which have been found to reduce the rate of gum formation I have called "gum retarding agents".

It is obvious, of course, that my test can be modified to a considerable extent, still giving results which can be used as a measure of the efficacy of certain agents in reducing the rate of gum formation. One rather obvious modification is the extension of the stability test beyond the usual 4 hour limit. In this case, tests upon the rate of gum formation can be made upon highly refined gasolines which normally have an induction period longer than 4 hours. Another possible modification is to stop the test and to determine the amount of gum formed at a certain time interval after the end of the induction period as determined during the same test. However, the method outlined above gives satisfactory results for all purposes and is sufficiently accurate. It requires less time than most of the modifications which may be suggested.

I have found that the use of an anti-oxidant which has the property, as determined by the oxygen stability test, of extending the duration of the induction period, together with the use of a retarding agent which has the property, as determined in the manner described, of reducing the rate of gum formation after the termination of the "oxygen stability period" gives a motor fuel more stable with respect to gum formation than the use of either substance alone in an amount equal to the sum of the amounts of the two said substances. Tests of gum formation during storage have been found to satisfactorily check, in relative values, the results obtained by the above tests.

In accordance with my invention I have obtained requisite stability of motor fuels by the use of smaller proportions of anti-oxidants and of retarding agents than would be possible by the use of substances possessing only one of the two properties above described or by the use of single substances possessing both of the two properties described.

In general I have found that anti-oxidants such as hydroquinone ammonia, alpha naphthol, and pyrogallol, which have the favorable property of increasing the duration of the induction period when used in small concentration have, also, often the objectionable property of increasing the rate at which gum forms after the expiration of the induction period, and that retarding agents such as alpha naphthylamine, and phenyl beta naphthylamine which have the favorable property of reducing the rate at which gum forms after the expiration of the induction period have substantially no effect on the duration of the induction period, when used in practicable concentrations.

Where anti-oxidants which tend to prolong the induction period are used alone, it is necessary to employ a sufficient proportion to cause the induction period to be prolonged to an extent equivalent in practice to the time during which the motor fuel is to be stored before use. When retarding agents are used alone I have also found that relatively large proportions must be employed to be effective. But I have found that mixtures of the two types possess the advantage of each type, with the objectionable feature of neither. It is possible by the application of my invention to secure motor fuels of exceptional stability by the use of a smaller percentage of the mixture of substances.

An example of the application of my invention is the addition to a motor fuel, comprising a considerable proportion of hydrocarbons formed by the cracking of petroleum, of 0.00075 per cent by weight of alpha naphthol together with 0.00025 per cent by weight of alpha naphthylamine. The treated motor fuel has an induction period more than twice as long as the untreated motor fuel and the rate of gum formation of the treated sample after the induction period is no greater than with the untreated sample. To obtain a similar stability without the corrective effect produced by the alpha naphthylamine, it is necessary to use 0.01 per cent alpha naphthol. The use of as much as 0.01 per cent alpha naphthylamine alone will not greatly increase the duration of the induction period but will reduce the rate of gum formation after the induction period.

The use of 0.001 per cent by weight of alpha naphthylamine together with 0.00075 per cent by weight of alpha naphthol not only more than doubles the duration of the induction period but also reduces by about 50 per cent the rate of gum formation after the induction period. It is evident from these results that the combined quantity of the two respective substances used is less than the quantity required of each substance alone to secure stability.

I believe it novel to use a combination of an anti-oxidant and a retarding agent, one having the effect of prolonging the induction period and the other having the effect of retarding the formation of gum after the induction period. While the proportions in the specific examples are found to be highly advantageous, larger percentages can be used and particularly with other inhibitors.

There are many substances which will act as anti-oxidants in prolonging the induction period and many substances which will act as retarding agents by slowing the rate of gum formation and these can be determined by the tests given.

Among the substances which I have found to be particularly useful as anti-oxidants in prolonging the induction period are hydroquinone ammonia, alpha naphthol, pyrogallol, triphenyl phosphate, benzidine, ortho toluidine, para toluidine, and calcium sucrate. In the class of substances which act as retarding agents to decrease the rate of formation of gum are alpha naphthylamine, phenyl beta naphthylamine, alpha naphthol benzein, dimethyl aniline, amyl alcohol, triphenyl carbinol, xylidene, meta toluidine, and lead sucrate. Quantities of these totaling somewhat less than 0.01 per cent by weight in a fuel are generally sufficient for my purposes. Concentrations of a few thousandths per cent of the more active of these agents are adequate.

In using the two classes of agents I have found as useful pairs and proportions by weight alpha naphthol (0.0005 per cent) and alpha naphthylamine (0.0005 per cent) and hydroquinone ammonia (0.0005 per cent) and diphenylamine (0.0010 per cent). There are some substances which have the property of extending the induction period and also of decreasing the rate of gum formation after the induction period. One of these is beta naphthol; another is hexamethylene tetramine; and a third is paraldehyde. Rather large amounts of these materials have to be used; while with the other substances mentioned small amounts are sufficient as for instance shown in the specific example.

By the use of both types of these agents together, great economy in material is secured with better results, as compared with the use of either singly. For example in stabilizing gasoline with hydroquinone ammonia, or with alpha naphthol, or with pyrogallol it is necessary to use enough to prolong the period of induction indefinitely unless the gasoline is to be quickly used. With these substances, once the induction period is over, formation of gum proceeds rather rapidly. Nevertheless, with the addition of a gum retarding substance such as phenyl beta naphthylamine, diphenylamine, etc., formation of gum can be retarded so that the gasoline can be stored for a considerable time before use without the formation of gum in detrimental quantities.

I have found it desirable in some cases to use more than one substance having the property of extending the induction period in combination with more than one substance having the property of decreasing the rate of gum formation after the induction period. For example, alpha naphthol is not very soluble in gasoline and its use in conjunction with pyrogallol is sometimes desirable. Hydroquinone is even less soluble in gasoline but mixtures of hydroquinone, pyrogallol and phenyl beta naphthylamine, for example, can be conveniently used and such combinations are often particularly effective.

Since the oxygen stability test can be used to determine the period of induction of motor fuels and since the subsequent rate of gum formation can be determined, it is a simple matter, as explained, to ascertain what substance will act to prolong the induction period with any particular gasoline and what substance will act to retard the formation of gum.

While some of the chemicals mentioned are relatively expensive, their use in the extremely small proportions stated is not commercially prohibitive. Larger proportions than stated may be used, depending upon the character of the petroleum product being treated, the probable time of storage before use and the like, but I regard percentages as low as 0.01 per cent by weight of the material to be sufficient for most instances.

What I claim is:

1. The process of stabilizing cracked motor fuels and the like which comprises adding thereto alpha-naphthol in the order of about 0.001 per cent to retard the gum induction period, together with phenyl beta naphthylamine in the order of about 0.0005 per cent to lower the rate of gum formation.

2. The process of making an improved, cracked motor fuel characterized by the addition thereto of small percentages of alpha-naphthol and of phenyl beta naphthylamine.

3. In the making of a cracked motor fuel of given stability specification, the process which comprises adding to the motor fuel alpha-naphthol and phenyl beta naphthylamine, the combined quantities of alpha-naphthol and phenyl beta naphthylamine being less than the quantity required of each of these substances alone to secure said stability specification.

4. A normally gum forming gasoline stabilized by containing hydroquinone ammonia and diphenylamine, the total quantities added being of the order of a few thousandths of 1 per cent by weight.

EUGENE AYRES.